US008951926B2

(12) United States Patent
Matano et al.

(10) Patent No.: US 8,951,926 B2
(45) Date of Patent: *Feb. 10, 2015

(54) OPTICAL GLASS FOR MOLD PRESS FORMING

(71) Applicant: Nippon Electric Glass Co., Ltd., Otsu-shi, Shiga (JP)

(72) Inventors: Takahiro Matano, Otsu (JP); Fumio Sato, Otsu (JP); Yoko Usui, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,929

(22) Filed: Oct. 17, 2013

(65) Prior Publication Data

US 2014/0045675 A1   Feb. 13, 2014

Related U.S. Application Data

(63) Continuation of application No. 13/320,755, filed as application No. PCT/JP2010/060018 on Jun. 14, 2010, now Pat. No. 8,697,589.

(30) Foreign Application Priority Data

| Jun. 15, 2009 | (JP) | 2009-142043 |
| Sep. 22, 2009 | (JP) | 2009-218254 |
| May 6, 2010 | (JP) | 2010-106306 |

(51) Int. Cl.

| C03C 3/14 | (2006.01) |
| C03C 3/064 | (2006.01) |
| C03C 4/02 | (2006.01) |
| C03C 3/15 | (2006.01) |
| C03C 3/155 | (2006.01) |
| C03C 3/253 | (2006.01) |

(52) U.S. Cl.

CPC ... C03C 4/02 (2013.01); C03C 3/14 (2013.01); C03C 3/15 (2013.01); C03C 3/155 (2013.01); C03C 3/253 (2013.01)

USPC .................. 501/49; 501/50; 501/51; 501/52; 501/77; 501/78

(58) Field of Classification Search

CPC ............ C03C 3/14; C03C 3/15; C03C 3/155; C03C 3/253; C03C 3/064; C03C 3/068
USPC .............................. 501/49, 50, 51, 52, 77, 78
See application file for complete search history.

(56) References Cited

U.S. PATENT DOCUMENTS

| 3,867,303 A * | 2/1975 | Shaw et al. ............. 252/301.6 P |
| 6,620,748 B1 * | 9/2003 | Sugimoto et al. ................ 501/64 |
| 7,737,064 B2 * | 6/2010 | Fu ................... 501/73 |
| 7,943,540 B2 * | 5/2011 | Yamamoto ...................... 501/50 |
| 8,058,196 B2 * | 11/2011 | Nagaoka et al. ................ 501/77 |
| 2007/0054794 A1 * | 3/2007 | Nagaoka et al. ................ 501/65 |
| 2008/0096752 A1 | 4/2008 | Nagaoka |
| 2008/0096753 A1 * | 4/2008 | Yamamoto ...................... 501/42 |

FOREIGN PATENT DOCUMENTS

| CN | 101172772 A | 5/2008 |
| JP | 2002308645 | * 10/2002 |
| JP | 2009269770 | * 11/2009 |
| JP | 2009280429 | * 12/2009 |

OTHER PUBLICATIONS

Erht, "Structure, properties and applications of borate glasses" Glass Tech, Dec. 2000, vol. 41, No. 6, pp. 182-185.*
Matano et al., "Optical Glass for Mold Press Forming", U.S. Appl. No. 13/320,755, filed Nov. 16, 2011.

* cited by examiner

*Primary Examiner* — Karl Group
(74) *Attorney, Agent, or Firm* — Keating & Bennett, LLP

(57) ABSTRACT

The invention provides an optical glass for press molding which can satisfy all of the following requirements: (1) it contains no environmentally undesirable components; (2) it can easily achieve a low glass transition point; (3) it has a high refractive index and high dispersion; (4) it can easily provide a glass having an excellent visible light transmittance; and (5) it has excellent resistance to devitrification during preparation of a preform. The optical glass for press molding has a refractive index nd of 1.925 or more, an Abbe's number vd of 10 to 30, and a glass composition, in % by mass, of 20 to 80% $Bi_2O_3$, 10 to 30% $B_2O_3$, and 0 to 5.5% $GeO_2$ and is substantially free of lead component, arsenic component, and F component.

6 Claims, No Drawings

OPTICAL GLASS FOR MOLD PRESS FORMING

TECHNICAL FIELD

This invention relates to optical glasses for press molding. Specifically, it relates to an optical glass for press molding which has a high refractive index and high dispersion and is therefore suitable for optical pickup lenses in various optical disc systems, image pickup lenses in video cameras and general cameras, and the like.

BACKGROUND ART

Optical pickup lenses in CD, MD, DVD, and various other optical disc systems and image pickup lenses in video cameras and general cameras are generally produced in the following manner.

First, molten glass is dropped from a nozzle tip and a glass in the shape of a droplet is formed (droplet forming). As needed the glass is ground, polished and/or cleaned to prepare a preform glass. Alternatively, molten glass is cast by rapid solidification to form a glass ingot and the glass ingot is ground, polished and cleaned to prepare a preform glass. Subsequently, the preform glass is softened by heat application, and press molded by a precision machined mold to transfer the surface profile of the mold to the glass, thereby producing a lens. Such a molding method is commonly called a press molding method.

In employing the press molding method, to precisely press-mold lenses while reducing the degradation of the mold, a glass having a glass transition point Tg as low as possible (at least not higher than 650° C.) is required. Various glasses for this are proposed.

If devitrification occurs during preparation of a preform glass, this means that the fundamental performance of a resultant mold-pressed lens is lost. Therefore, it is important that the glass should have excellent resistance to devitrification. Furthermore, with recent increasing awareness of environmental issues, there is demand for an optical glass in which no harmful substances, such as lead, are used as its glass components. In recent years, it has been considered that for the purpose of cost reduction, optical lenses, such as optical pickup lenses for various optical disc systems and image pickup lenses, are reduced in lens thickness or number of lenses used. In order to achieve such reduction in lens thickness or reduction in number of lenses, a glass material is desired which has a high refractive index and high dispersion (i.e., a small Abbe's number). Examples of proposed glasses having these optical properties include optical glasses containing bismuth as a main component (see, for example, Patent Literatures 1 to 3).

CITATION LIST

Patent Literature

Patent Literature 1: JP-A-2002-201039
Patent Literature 2: JP-A-2007-106625
Patent Literature 3: JP-A-2006-151758

SUMMARY OF INVENTION

Technical Problem

Generally, in trying to produce a high-refractive index optical glass, a problem may arise in that coloration occurs so that the transmittance, particularly the transmittance in the visible range or near-ultraviolet range, is likely to decrease.

On the other hand, if a component for inhibiting coloration is added, the Abbe's number tends to increase, i.e., the optical glass tends to have low dispersion. Thus, it is considered difficult to produce an optical glass having a high refractive index and high dispersion and also being excellent in visible light transmittance.

Therefore, an object of the present invention is to provide an optical glass for press molding which can satisfy all of the following requirements: (1) it contains no environmentally undesirable components; (2) it can easily achieve a low glass transition point; (3) it has a high refractive index and high dispersion; (4) it can easily provide a glass having an excellent visible light transmittance; and (5) it has excellent resistance to devitrification during preparation of a preform.

Solution to Problem

The inventors have found from the results of various experiments that a glass having a particular composition containing $Bi_2O_3$ and $B_2O_3$ as main components can achieve the above object, and propose the present invention.

Specifically, the present invention is concerned with an optical glass for press molding which has a refractive index nd of 1.925 or more, an Abbe's number vd of 10 to 30, and a glass composition, in % by mass, of 20 to 90% $Bi_2O_2$, 10 to 30% $B_2O_3$, and 0 to 5.5% $GeO_2$ and is substantially free of lead component, arsenic component, and F component.

The optical glass for press molding according to the present invention has optical properties of a high refractive index and high dispersion. Furthermore, if the refractive index is equivalent to those of conventional glasses, higher-transmittance glasses can be produced. Therefore, the lens thickness and the number of lenses can be reduced, whereby even higher-definition optical devices can be produced. This makes it possible to reduce the component cost of the devices and enhance the performance thereof.

Since the optical glass for press molding according to the present invention contains a large amount of $Bi_2O_2$ in its composition, it easily achieves a low glass transition point. Therefore, it can be press-molded at low temperatures, which reduces the degradation of the mold due to volatilized matter of glass components. Furthermore, the optical glass for press molding according to the present invention has the feature that during preparation of a preform, devitrified matter which would inhibit transparency is less likely to be produced. Moreover, since the optical glass is substantially free of lead component, arsenic component, and F component which are harmful components, it is an environmentally desirable glass.

As used in the present invention, "substantially free of lead component, arsenic component, and F component" means that no amount of these components are deliberately incorporated into the glass and does not mean to fully exclude even the presence of unavoidable impurities. Objectively speaking, this means that the content of each of these components, inclusive of impurities, is below 0.1% by mass.

Secondly, in the optical glass for press molding according to the present invention, the content of $Bi_2O_3+B_2O_3$ is preferably 60 to 100% by mass.

When the total content of $Bi_2O_3$ and $B_2O_3$ is controlled within the above range, a glass can be easily obtained which has a high refractive index and high dispersion and is excellent in transmittance.

Thirdly, the optical glass for press molding according to the present invention preferably contains 0 to 10% by mass ZnO.

Fourthly, the optical glass for press molding according to the present invention preferably contains 0 to below 3% by mass $SiO_2$.

Fifthly, in the optical glass for press molding according to the present invention, $La_2O_3+Gd_2O_3+Ta_2O_3$ is preferably 7.5 to 30% by mass. As used in the present invention, "$La_2O_3+Gd_2O_3+Ta_2O_3$" indicates the total content of these components.

Sixthly, in the optical glass for press molding according to the present invention, $Bi_2O_3/B_2O_3$ is preferably 5 or less in mass ratio. As used in the present invention, "$Bi_2O_3/B_2O_3$" indicates the content ratio between these components.

Seventhly, the optical glass for press molding according to the present invention preferably contains 0.1 to 15% by mass $TiO_2$.

The inclusion of $TiO_2$ enables the glass to increase its refractive index and dispersion and improve its weatherability.

Eighthly, in the optical glass for press molding according to the present invention, the content of $Bi_2O_3+B_2O_3$ is preferably 99% or more.

When the total content of $Bi_2O_3$ and $B_2O_3$ is very large, as large as 99% or more, the glass can be further increased in refractive index and dispersion.

Ninthly, in the optical glass for press molding according to the present invention, the content of $Bi_2O_3+B_2O_3+TiO_2$ is preferably 99% or more.

When the total content of $Bi_2O_3$, $B_2O_3$, and $TiO_2$ is very large, as large as 99% or more, the glass can be further increased in refractive index and dispersion.

Tenthly, the optical glass for press molding according to the present invention preferably has a coloration $\lambda_{70}$ of 500 nm or less. As used in the present invention, "coloration $\lambda_{70}$" refers to the wavelength at which the glass reaches a transmittance of 70%.

When the coloration $\lambda_{70}$ meets the above range, the glass is excellent in transmittance in the visible range or near-ultraviolet range and therefore suitable for various types of optical lenses.

DESCRIPTION OF EMBODIMENTS

A detailed description will be given below of the reasons why the content of each component in the optical glass for press molding of the present invention is specified as above. Unless otherwise stated, "%" used herein means "% by mass".

$Bi_2O_3$ is an essential component for achieving high refraction and high dispersion, decrease in Tg (glass transition point), improved chemical durability, etc., and is also effective as a component for inhibiting devitrification of the glass. The $Bi_2O_3$ content is preferably 20 to 90%, more preferably 20 to 85%, still more preferably 20 to 83%, even more preferably 25 to 80%, and particularly preferably 30 to 75%. If the $Bi_2O_3$ content is below 20%, the glass will be unstable, which may impair the resistance to devitrification or may make it difficult to achieve desired optical properties and a low Tg. On the other hand, if the $Bi_2O_3$ content is above 90%, then because of high volatility of $Bi_2O_3$ the mold will be likely to degrade during press molding, the glass will be likely to fuse to the mold, and its chemical durability will decrease. In addition, the glass transmittance will be likely to decrease.

$B_2O_3$ is a component for forming the glass network. Furthermore, it is a component for increasing the glass transmittance and can prevent decrease in transmittance near the ultraviolet range and shift the absorption edge to a shorter wavelength. Particularly, high-refractive index glasses are likely to get the effect of $B_2O_3$ increasing the transmittance. In addition, $B_2O_3$ is also effective as a component for inhibiting devitrification of the glass. The $B_2O_3$ content is preferably 10 to 30%, more preferably 12 to 28%, still more preferably 14 to 27%, and particularly preferably 17 to 27%. If the $B_2O_3$ content is less than 10%, it will be difficult to obtain a high-transmittance glass. On the other hand, if the $B_2O_3$ content is above 30%, then because of its ease of increasing the Abbe's number, it will be difficult to obtain a high-dispersion glass and to obtain a high-refractive index glass.

In producing a glass having high refraction and high dispersion and excellent in transmittance in the present invention, it is preferred to control the total content of $Bi_2O_3$ and $B_2O_3$. Specifically, the total content of these components is preferably 60 to 100%, more preferably 70 to 100%, and particularly preferably 80 to 99.99%. When the total content of $Bi_2O_2$ and $B_2O_3$ is very large, as large as 99% or more, particularly 99.9% or more, a glass can be obtained which is particularly excellent in high refractive index and high dispersion properties.

Furthermore, to obtain a glass having an excellent coloration in the present invention, it is preferred to control the $Bi_2O_2/B_2O_2$ ratio. Specifically, the $Bi_2O_2/B_2O_2$ ratio is preferably 5 or less, more preferably 4.5 or less, and particularly preferably 4 or less. If the ratio between these components is 5 or more, it will be difficult to maintain a glass having an excellent coloration.

$GeO_2$ is a component for offering optical properties of a high refractive index and high dispersion. However, if $GeO_2$ is added in large amounts, the glass transmittance will be likely to decrease. In addition, because $GeO_2$ is an expensive material, the use thereof in large amounts leads to a high glass cost. Therefore, the $GeO_2$ content is preferably 0 to 5.5%, more preferably 0 to 5%, still more preferably 0 to 4.5%, and particularly preferably 0.1 to 4.5%.

The optical glass for press molding according to the present invention can contain, in addition to the above components, the following components.

ZnO is a component that can decrease the glass viscosity without decreasing the refractive index. Thus, the glass transition point can be decreased, whereby a glass can be obtained which is less likely to fuse to the mold. Furthermore, ZnO also has the effect of increasing the weatherability. Moreover, because ZnO does not have so strong a tendency to devitrify the glass as alkaline earth metal components (MgO, CaO, SrO, and BaO), it can provide a homogeneous glass even when contained in large amounts and is a component less likely to color the glass. The ZnO content is preferably 0 to 10%, more preferably 0 to 8%, and particularly preferably 0.1 to 5%. If the ZnO content is above 10%, the weatherability will conversely tend to be impaired. In addition, it will be difficult to obtain a high-dispersion glass or a high-refraction glass.

$ZrO_2$ is a component for increasing the refractive index and increasing the Abbe's number. In addition, $ZrO_2$ forms the glass network as an intermediate oxide and therefore has the effects of improving the resistance to devitrification (reducing the formation of devitrified matter due to $B_2O_3$ and $La_2O_2$) and increasing the chemical durability. However, if the $ZrO_2$ content is large, the glass transition point will increase, which may impair the press-moldability and may be likely to cause precipitation of devitrified matter containing $ZrO_2$ as a main component. The $ZrO_2$ content is preferably 0 to 10%, more preferably 0 to 7.5%, and particularly preferably 0.1 to 5%.

$La_2O_2$ is a component that can increase the refractive index of the glass while preventing decrease in transmittance thereof; however, inclusion of large amounts of $La_2O_3$ is undesirable because devitrified matter will be likely to precipitate. The $La_2O_3$ content is preferably 0 to 20%, and more preferably 0.1 to 10%. If the $La_2O_3$ content is above 20%, this will impair the resistance to devitrification and make it difficult to obtain a high-dispersion glass.

$Gd_2O_3$ is, like $La_2O_3$, a component that can increase the refractive index of the glass while preventing decrease in transmittance thereof. The $Gd_2O_3$ content is preferably 0 to 20%, more preferably 0 to 10%, and particularly preferably 0.1 to 10%.

If the $Gd_2O_3$ content is above 20%, this will impair the resistance to devitrification and make it difficult to obtain a high-dispersion glass.

$Ta_2O_5$ has the effect of increasing the refractive index and dispersion of the glass while preventing decrease in transmittance thereof. The $Ta_2O_5$ content is preferably 0 to 20%, more preferably 0 to 15%, and particularly preferably 0.1 to 10%. If the $Ta_2O_5$ content is above 20%, the resistance to devitrification of the glass will be likely to be impaired.

In the optical glass for press molding according to the present invention, to obtain a high-refractive index glass in a region where the $Bi_2O_3$ content is small, it is preferred to control $La_2O_3+Gd_2O_3+Ta_2O_5$. Specifically, the total content of these components is preferably 7.5 to 30%, more preferably 8 to 25%, and particularly preferably 10 to 20%. If the total content of these components is below 7.5%, it will be difficult to maintain high refractive index; on the other hand, if the total content thereof is above 30%, the glass will be less likely to have high dispersion and will be likely to devitrify. The region where the $Bi_2O_3$ content is small means cases where the $Bi_2O_3$ content is 75% or less. On the other hand, in a region where the $Bi_2O_3$ content is large, a large content of $La_2O_3+Gd_2O_3+Ta_2O_5$ may cause a decrease in transmittance. Therefore, the total content is preferably 0 to 20%, more preferably 0 to 10%, and particularly preferably 0 to 5%. The region where the $Bi_2O_3$ content is large means cases where the $Bi_2O_3$ content is 75% or more.

$Nb_2O_5$, $WO_3$, and $TiO_2$ are components that are highly effective in increasing the refractive index and also effective in increasing the dispersion. In addition, they have a strong effect of decreasing the resistance to devitrification as compared to $La_2O_3$, $Gd_2O_3$, and $Ta_2O_5$. However, they are likely to decrease the transmittance and therefore limiting of their contents is desirable.

The $Nb_2O_5$ content is preferably 0 to 10%, more preferably 0 to 5%, and particularly preferably 0.1 to 5%. If the $Nb_2O_5$ content is above 10%, devitrified matter containing $Nb_2O_5$ as a main component will be likely to precipitate on the glass surface (surface devitrification). In addition, the glass transmittance will tend to decrease.

Among the above components, $WO_3$ is the most effective component for increasing the resistance to devitrification of the glass. However, if its content is too large, the glass transmittance will tend to decrease. Therefore, the $WO_3$ content is preferably 0 to 10%, more preferably 0 to 5%, and particularly preferably 0.1 to 5%. $WO_3$ has a lower rate of decreasing the transmittance than $La_2O_3$, $Gd_2O_3$, and $Ta_2O_5$. Therefore, positive addition of $WO_3$ makes it easy for the glass to obtain optical properties of a high refractive index and high dispersion while maintaining a relatively high transmittance. Specifically, to obtain the above effect, $WO_3$ is preferably added to give a content of 1% or more, and particularly preferably 2% or more.

Among the above components, $TiO_2$ is, like $WO_3$, particularly effective in offering optical properties of a high refractive index and high dispersion and also has the effect of increasing the weatherability. Furthermore, $TiO_2$ is a component effective in increasing the resistance to devitrification of the glass, but among the above components, it is a component most likely to decrease the transmittance. Particularly if a large amount of Fe is contained as an impurity in the glass, the occurrence of decrease in transmittance will be significant. Therefore, the $TiO_2$ content is preferably 0 to 15%, more preferably 0 to 10%, still more preferably 0 to 5%, and particularly preferably 0.1 to 5%. To obtain the above effects, the $TiO_2$ content is preferably 0.1 to 15%. Note that if the content of Fe as an impurity is 20 ppm or more, the occurrence of decrease in transmittance will be significant.

When the total content of $Bi_2O_3$, $B_2O_3$, and $TiO_2$ is very large, as large as 99% or more, particularly 99.9% or more, a glass can be obtained which is particularly excellent in high refractive index and high dispersion properties. Furthermore, to prevent decrease in transmittance while maintaining desired optical properties, a low Tg, and even chemical durability, the $TiO_2/Bi_2O_3+TiO_2$ ratio is preferably controlled at 0.048 or less, particularly preferably at 0.045 or less.

It should be avoided on environmental grounds that a lead component (PbO), an arsenic component ($As_2O_3$), and an F component ($F_2$) be substantially introduced into the glass. Therefore, the glass in the present invention is substantially free of these components.

Furthermore, the optical glass for press molding according to the present invention can contain, in addition to the above components, $Li_2O$, $Na_2O$, and $K_2O$. These alkali metal oxides ($R'_2O$) are components for decreasing the softening point.

Among $R'_2O$ components, $Li_2O$ is most effective in decreasing the softening point. However, $Li_2O$ has high phase separability. If its content is too large, the liquidus temperature will increase (the liquid phase viscosity will decrease) to precipitate devitrified matter, which may impair the workability. In addition, volatilized matter produced during press molding will increase and the glass will be likely to fuse to the mold. Furthermore, $Li_2O$ is a component that may decrease the chemical durability and largely decrease the refractive index. Therefore, if $Li_2O$ is contained in large amounts, it will be difficult to obtain a high-refractive index glass. Therefore, its content is preferably 0 to 5%, more preferably 0 to 3%, and particularly preferably 0.1 to 1.5%.

$Na_2O$, like $Li_2O$, has the effect of decreasing the softening point. However, if its content is too large, the refractive index will tend to considerably decrease and volatilized matter formed by $B_2O_3$ and $Na_2O$ during glass melting will tend to increase to promote the production of striae. Furthermore, the liquidus temperature will increase so that devitrified matter may be likely to precipitate in the glass. Moreover, volatilized matter produced during press molding will increase and the glass will be likely to fuse to the mold. $Na_2O$ is also a component that may decrease the refractive index. Therefore, the $Na_2O$ content is preferably 0 to 10% and particularly preferably 0.1 to 5%.

$K_2O$, like $Li_2O$, also has the effect of decreasing the softening point. If the $K_2O$ content is too large, the refractive index will tend to considerably decrease and the weatherability will tend to be impaired. Furthermore, the liquidus temperature will increase so that devitrified matter may be likely to precipitate in the glass. Moreover, volatilized matter produced during press molding will increase and the glass will be likely to fuse to the mold. Therefore, the $K_2O$ content is preferably 0 to 10% and particularly preferably 0.1 to 5%.

Various components other than the above components may be incorporated into the optical glass for press molding according to the present invention within the range in which desired glass properties in the present invention will not be impaired. Examples of such other components include $SiO_2$, $Al_2O_3$, CaO, BaO, SrO, $Y_2O_3$, $Yb_2O_3$, and fining agents.

$SiO_2$ is a component that can form the glass network together with $B_2O_3$. Furthermore, it also has the effect of increasing the weatherability, and particularly it is significantly effective in preventing components in glass, such as $B_2O_3$ and alkali metal oxides, from being selectively eluted into water. The $SiO_2$ content is preferably 0 to 3% and particularly preferably 0.1 to 2%. If the $SiO_2$ content is above 3%, the glass meltability will be impaired. For example, at low glass melting temperatures of not higher than 1100° C., the glass may partly remain unmelted or striae or seeds may be left in the glass. Thus, a desired quality of lens glass may not be satisfied.

$Al_2O_3$ is a component that can form the glass network together with $SiO_2$ and $B_2O_3$. Furthermore, it also has the effect of increasing the weatherability, and particularly it is significantly effective in preventing components in glass, such as $B_2O_3$ and alkali metal oxides, from being selectively eluted into water. The $Al_2O_3$ content is preferably 0 to 10% and particularly preferably 0.1 to 5%. If the $Al_2O_3$ content is above 10%, the glass will be likely to devitrify. In addition, the glass meltability will be impaired so that striae or seeds may be left in the glass, whereby a desired quality of lens glass may not be satisfied.

In the optical glass for press molding according to the present invention, the total content of $Bi_2O_3$, $B_2O_3$, $SiO_2$, $WO_3$, $TiO_2$, and $Nb_2O_5$ is preferably 95.5% or more, more preferably 96% or more, still more preferably 97% or more, yet still more preferably 98% or more, and particularly preferably 99% or more. When these components are limited to the above ranges, optical properties of a high refractive index and high dispersion can be easily attained.

Alkaline earth metal oxides (RO), such as CaO, SrO, and BaO, act as fluxes and have the effect of inhibiting increase in Abbe's number without significantly decreasing the refractive index. If the content of RO is too large, the liquidus temperature will increase so that devitrified matter will tend to precipitate during melting and forming of the glass to thereby narrow the operation temperature range. As a result, it will tend to become difficult to mass-produce glass. Furthermore, the weatherability will be likely to be conversely impaired, the amount of glass components eluted in an aqueous abrasive cleaner or various cleaning solutions will increase, and the glass surface will significantly alter in high-temperature high-humidity conditions. In addition, it will be difficult to obtain a high-transmittance glass. Therefore, the total content of CaO, SrO, and BaO is preferably 0 to 20%, more preferably 0.1 to 10%, still more preferably 0.1 to 5%, and particularly preferably 0.1 to 3%.

CaO is a component that does not largely decrease the refractive index without decreasing the Abbe's number. Furthermore, it is an effective component for increasing the weatherability and is highly effective in increasing the water resistance and alkali resistance. However, if its additive amount is large, the glass will be colored, resulting in an undesirable coloration. The CaO content is preferably 0 to 10% and particularly preferably 0.1 to 5%.

SrO is a component for increasing the refractive index. Furthermore, it is more effective in increasing the water resistance and alkali resistance of the glass than CaO. Therefore, positive use of SrO can provide a product excellent in weatherability. However, if its additive amount is large, the glass will be colored, resulting in an undesirable coloration. The SrO content is preferably 0 to 20%, more preferably 0 to 10%, and particularly preferably 0.1 to 5%.

BaO is a component that does not largely decrease. Furthermore, as compared to CaO, it can inhibit rise in liquidus temperature and is more effective in increasing the water resistance and alkali resistance of the glass. However, if its additive amount is large, the glass will be colored, resulting in an undesirable coloration. The BaO content is preferably 0 to 20% and particularly preferably 0.1 to 5%.

The glass may contain, aside from CaO, BaO and SrO, MgO as an RO component in order to increase the refractive index. The MgO content is preferably 0 to 10% and particularly preferably 0.1 to 5%. If the MgO content is above 10%, the glass will be likely to devitrify.

$Y_2O_3$ and $Yb_2O_3$ are components for increasing the refractive index but also components that may decrease the dispersion. Furthermore, these components also have the effect of inhibiting phase separation. $Y_2O_3$ and $Yb_2O_3$ can improve the resistance to devitrification by the replacement with $La_2O_3$. Each of the $Y_2O_3$ content and $Yb_2O_3$ content is preferably 0 to 10% and particularly preferably 0.1 to 8%. If the $Y_2O_3$ content or $Yb_2O_3$ content is above 10%, the glass will be likely to devitrify and will tend to narrow the operation temperature range. Furthermore, striae will be likely to occur in the glass.

A fining agent, for example, $Sb_2O_3$ or $SnO_2$, can be added to the glass. Particularly, $Sb_2O_3$ is effective in fining a glass that can melt at low temperatures, and can prevent the glass from being colored due to Fe or the like as an impurity. However, if the additive amount of the fining agent is too large, devitrified matter of $Sb_2O_3$ will be likely to be produced. The content of fining agent is preferably 0 to 1% and particularly preferably 0.001 to 0.1%.

The refractive index (nd) of the optical glass for press molding according to the present invention is preferably 1.925 or more, more preferably 1.93 or more, and particularly preferably 1.95 or more. The Abbe's number (vd) of the optical glass for press molding according to the present invention is preferably 10 to 30, more preferably 12 to 28, and particularly preferably 15 to 26. When the glass satisfies these optical properties, it is suitable as a small-color dispersion, high-functionality, small-size optical lens for an optical device.

In this manner, to attain optical properties of a high-refractive index and high-dispersion, it is effective to add to the glass, in addition to $Bi_2O_3$, other components, such as $GeO_2$, $La_2O_3$, $Gd_2O_3$, $Ta_2O_5$, $Nb_2O_5$, $WO_3$, and $TiO_2$. However, among them are components that may decrease the resistance to devitrification or the transmittance; therefore, the additive amounts of them should be appropriately controlled.

The optical glass for press molding according to the present invention preferably has a coloration $\lambda_{70}$ of 500 nm or less, more preferably 450 nm or less, and particularly preferably 400 nm or less. If the coloration $\lambda_{70}$ is above 500 nm, the glass will be poor in transmittance in the visible range or near-ultraviolet range and therefore will be difficult to use for various types of optical lenses.

To control the coloration $\lambda_{70}$ within the above range, it is effective to control the $Bi_2O_3/B_2O_3$ ratio or limit the contents of components that may decrease the transmittance, such as $Nb_2O_5$, $WO_3$, and $TiO_2$. Alternatively, as will be described later, it is preferred to prevent precipitation of metal bismuth by melting the glass in an oxidative atmosphere. If platinum is mixed as an impurity into the glass, the transmittance will tend to decrease. Therefore, the material for the melting furnace is preferably a material containing no platinum as much as possible. For example, the preferred material for a melting furnace to be employed is a material containing gold as a main component. When a batch material having a small particle size or a previously vitrified batch material is used, the meltability can be increased to prevent mixture of unmelted impurities into the glass.

The optical glass for press molding according to the present invention preferably has a glass transition point of 650° C. or lower, more preferably 640° C. or lower, and particularly preferably 630° C. or lower. When the glass transition point decreases, press molding can be implemented at low temperatures to prevent the occurrence of problems with the mold, such as oxidation of the mold or contamination of the mold due to volatilized glass components, and fusion of the glass to the mold.

Next, a description will be given of a method for producing an optical pickup lens, an image pickup lens or the like using a glass according to the present invention.

First, glass raw materials are mixed together to give a desired composition and then melted in a glass melting furnace. To produce the optical glass for press molding according to the present invention, it is necessary to select optimum glass raw materials to give the desired composition, prevent mixture of impurities into the glass, and control the glass melting atmosphere. Particularly, bismuth oxide is likely to oxidize other components or reduce itself into metal bismuth, causing decreased transmittance. Therefore, the glass raw materials are preferably melted in an oxidative atmosphere. To realize an oxidative melting atmosphere, it is preferred to use raw materials containing a large amount of nitrate material, carbonate material, hydrate or the like, each serving as an oxidizing agent, for example, bismuth nitrate, lanthanum nitrate, gadolinium nitrate, and barium nitrate. Furthermore, when an oxygen-rich gas is introduced into the glass during melting, a more oxidative melting atmosphere can be achieved.

If the glass raw materials are melted at high temperatures, bismuth itself will be likely to be reduced to precipitate metal bismuth. Therefore, the melting temperature is preferably as low as possible. Specifically, the melting temperature is preferably not higher than 1200° C., more preferably not higher than 1150° C., and particularly preferably not higher than 1100° C. Although no particular limitation is placed on the lower limit, the melting temperature is preferably not lower than 700° and particularly preferably not lower than 800° C. in order to sufficiently melt the glass raw materials to be vitrified.

Next, the molten glass is dropped from a nozzle tip and a glass in the shape of a droplet is formed to obtain a preform glass. Alternatively, the molten glass is cast by rapid solidification to prepare a glass block and the glass block is ground, polished and washed to obtain a preform glass.

Subsequently, the preform glass is charged into a precision machined mold and press molded therein while being subjected to heat application until it becomes a softened state, thereby transferring the surface profile of the mold to the preform glass. In this manner, an optical pickup lens, an image pickup lens or the like can be obtained.

EXAMPLES

Hereinafter, the present invention will be described in detail with reference to examples, but is not limited to the examples.

Tables 1 to 7 show examples of the present invention (Samples Nos. 1 to 38 and 42 to 57) and comparative examples (Samples Nos. 39 to 41).

TABLE 1

| (% by mass) | 1 | 2 | 3 | 4 | 5 | 6 | 7 | 8 |
|---|---|---|---|---|---|---|---|---|
| $Bi_2O_3$ | 55.1 | 53.7 | 74.7 | 53.8 | 29.6 | 62.1 | 61.7 | 61.8 |
| $SiO_2$ | | | | | | | | |
| $B_2O_3$ | 13.3 | 18 | 16.5 | 18 | 22.3 | 13.9 | 13.8 | 13.9 |
| $Ge_2O$ | 4.8 | 2.1 | | 2.1 | 2.6 | | | |
| $La_2O_3$ | 10.0 | 10.9 | | 10.9 | 13.5 | 6 | 5.9 | 6 |
| $Gd_2O_3$ | 3.4 | 3.7 | 3 | 3.7 | | 5.3 | 5.3 | 5.3 |
| $ZrO_2$ | 3.3 | 3.6 | 0.8 | 3.6 | 4.5 | 3.1 | 5.3 | 3 |
| $Ta_2O_5$ | 4.4 | 4.8 | 2 | 4.8 | 11.5 | 5.1 | 5 | 5 |
| ZnO | 2.9 | 3.1 | 3 | 3.1 | 5.1 | 4.5 | 3 | |
| BaO | | | | | | | | 5 |
| $Na_2O$ | | | | | | | | |
| $K_2O$ | | | | | | | | |
| $Nb_2O_5$ | | | | | | | | |
| $WO_3$ | 2.7 | | | | | | | |
| $TiO_2$ | | | | | | 11 | | |
| $Sb_2O_3$ | 0.1 | 0.1 | 0.05 | 0.05 | 0.02 | 0.02 | 0.01 | 0.05 |
| La + Gd + Ta | 17.8 | 19.4 | 5.0 | 19.4 | 25.0 | 16.4 | 16.2 | 16.3 |
| Bi/B | 4.1 | 3.0 | 4.5 | 3.0 | 1.3 | 4.5 | 4.5 | 4.4 |
| Refractive Index nd | 2.0095 | 1.9852 | 2.0430 | 1.9643 | 1.9607 | 2.0187 | 2.0404 | 2.0214 |
| Abbe's Number | 23.0 | 25.0 | 21.1 | 26.1 | 26.1 | 22.2 | 21.8 | 22.1 |
| Glass Transition Point (° C.) | 477 | 481 | 460 | 490 | 561 | 459 | 463 | 458 |
| Coloration $\lambda_{70}$ (nm) | 465 | 460 | 440 | 440 | 475 | 452 | 455 | 462 |

TABLE 2

| (% by mass) | 9 | 10 | 11 | 12 | 13 | 14 | 15 | 16 |
|---|---|---|---|---|---|---|---|---|
| $Bi_2O_3$ | 66.3 | 72 | 64.7 | 62.9 | 63.2 | 61.8 | 58.6 | 61.5 |
| $SiO_2$ | | | | | | | | |
| $B_2O_3$ | 14.9 | 18 | 17.2 | 14.8 | 10.3 | 10 | 10.8 | 14.5 |
| $Ge_2O$ | | | | | | | | |
| $La_2O_3$ | 6.3 | 2 | 10.6 | 6 | 6 | 5.9 | 5.6 | |
| $Gd_2O_3$ | 5.7 | 3 | 4.7 | 5.3 | 5.3 | 5.2 | 4.9 | 5.2 |

TABLE 2-continued

| (% by mass) | 9 | 10 | 11 | 12 | 13 | 14 | 15 | 16 |
|---|---|---|---|---|---|---|---|---|
| $ZrO_2$ | 3.3 | | 1.5 | 3 | 3 | 3 | 2.8 | 2.9 |
| $Ta_2O_5$ | | 2 | | 5 | 5 | 4.9 | 4.7 | 12.9 |
| ZnO | 2 | 3 | 1.3 | 3 | 3 | 3 | 2.8 | 2.9 |
| BaO | 1.5 | | | | | | | |
| $Na_2O$ | | | | | 4.2 | | | |
| $K_2O$ | | | | | | | 6.3 | |
| $Nb_2O_5$ | | | | | | | | |
| $WO_3$ | | | | | | | | 9.8 |
| $TiO_2$ | | | | | | | | |
| $Sb_2O_3$ | 0.02 | 0.005 | 0.005 | 0.005 | 0.005 | 0.005 | 0.005 | 0.05 |
| La + Gd + Ta | 12.0 | 7.0 | 15.3 | 16.3 | 16.3 | 16.0 | 15.2 | 18.1 |
| Bi/B | 4.4 | 4.0 | 3.8 | 4.3 | 6.1 | 6.2 | 5.4 | 4.3 |
| Refractive Index nd | 2.0358 | 2.0108 | 2.0147 | 2.0224 | 1.9897 | 1.9882 | 2.0064 | 2.0516 |
| Abbe's Number | 21.8 | 21.6 | 23.2 | 22.2 | 20.8 | 21.5 | 20.8 | 21.0 |
| Glass Transition Point (° C.) | 445.1 | 437.7 | 448.5 | 459.2 | 411.2 | 437.2 | 469.9 | 463.6 |
| Coloration $\lambda_{70}$ (nm) | 454 | 443 | 456 | 452 | 443 | 446 | 448 | 441 |

TABLE 3

| (% by mass) | 17 | 18 | 19 | 20 | 21 | 22 | 23 | 24 |
|---|---|---|---|---|---|---|---|---|
| $Bi_2O_3$ | 61.6 | 62.2 | 63.7 | 50.8 | 42.5 | 36.5 | 63.2 | 58.6 |
| $SiO_2$ | | | | | | | 2.7 | |
| $B_2O_3$ | 14.5 | 14.6 | 15.0 | 21.9 | 26.2 | 19.1 | 11.7 | 10.8 |
| $Ge_2O$ | | | | | | | | |
| $La_2O_3$ | | 6.0 | 9.9 | 7.4 | 8.3 | 15.7 | 6.1 | 5.6 |
| $Gd_2O_3$ | 5.1 | | 5.3 | 6.4 | 7.2 | 15.7 | 5.3 | 4.9 |
| $ZrO_2$ | 2.9 | 3.0 | 3.0 | 3.7 | 4.9 | 3.5 | 3.0 | 2.8 |
| $Ta_2O_5$ | 12.9 | 11.3 | | 6.1 | 6.8 | 5.9 | 5.0 | 4.7 |
| ZnO | 2.9 | 3.0 | 3.0 | 3.7 | 4.1 | 3.5 | 3.0 | 2.8 |
| BaO | | | | | | | | |
| $Na_2O$ | | | | | | | | |
| $K_2O$ | | | | | | | | |
| $Nb_2O_5$ | | | | | | | | 9.8 |
| $WO_3$ | | | | | | | | |
| $TiO_2$ | | | | | | | | |
| $Sb_2O_3$ | 0.002 | 0.05 | 0.05 | 0.009 | 0.1 | 0.1 | 0.05 | 0.05 |
| La + Gd + Ta | 18.1 | 17.3 | 15.2 | 19.9 | 22.3 | 37.3 | 16.4 | 15.2 |
| Bi/B | 4.3 | 4.3 | 4.2 | 2.3 | 1.6 | 1.9 | 5.4 | 5.4 |
| Refractive Index nd | 2.0156 | 2.0180 | 2.0265 | 1.9492 | 1.9271 | 1.9254 | 2.0188 | 2.0123 |
| Abbe's Number | 21.7 | 21.6 | 22.6 | 26.8 | 29.6 | 29.9 | 21.8 | 20.4 |
| Glass Transition Point (° C.) | 475.5 | 466.6 | 449.1 | 495.2 | 520.4 | 521.4 | 457.1 | 463.0 |
| Coloration $\lambda_{70}$ (nm) | 445 | 447 | 449 | 435 | 431 | 477 | 445 | 445 |

TABLE 4

| (% by mass) | 25 | 26 | 27 | 28 | 29 | 30 | 31 | 32 |
|---|---|---|---|---|---|---|---|---|
| $Bi_2O_3$ | 69.7 | 75.3 | 73.4 | 74.6 | 74.6 | 59.2 | 59.2 | 74.5 |
| $SiO_2$ | | | | | | | | |
| $B_2O_3$ | 17.9 | 18.2 | 17.8 | 18.0 | 17.5 | 11.5 | 11.5 | 19.6 |
| $Ge_2O$ | 3.0 | 2.8 | | 1.6 | 1.6 | 5.3 | 2.8 | |
| $La_2O_3$ | | 0.7 | 0.7 | | | 8.9 | 8.9 | |
| $Gd_2O_3$ | 3.2 | 3.0 | 2.9 | 2.9 | | 2.3 | 2.3 | 3.0 |
| $ZrO_2$ | 0.8 | | | | | 2.9 | 2.9 | 0.8 |
| $Ta_2O_5$ | 2.2 | | | | | 4.9 | 4.9 | 2.0 |
| ZnO | 3.2 | | | 0.7 | | 2.5 | 2.5 | |
| BaO | | | | | | | | |
| $Na_2O$ | | | | | | | | |
| $K_2O$ | | | | | | | | |
| $Nb_2O_5$ | | | | | | 2.5 | 2.5 | |
| $WO_3$ | | | 5.2 | 2.1 | 6.3 | | 2.5 | |
| $TiO_2$ | | | | | | | | |
| $Sb_2O_3$ | 0.1 | 0.005 | 0.005 | 0.05 | 0.01 | 0.01 | 0.01 | 0.08 |
| La + Gd + Ta | 5.4 | 3.7 | 3.6 | 2.9 | 0.0 | 16.1 | 16.1 | 5.0 |
| Bi/B | 3.9 | 4.1 | 4.1 | 4.1 | 4.3 | 5.1 | 5.1 | 3.8 |
| Refractive Index nd | 2.0116 | 2.0366 | 2.0179 | 2.0290 | 2.0209 | 2.0350 | 2.0420 | 2.0000 |
| Abbe's Number | 21.8 | 20.8 | 20.5 | 20.7 | 19.8 | 21.2 | 21.1 | 21.0 |

TABLE 4-continued

| (% by mass) | 25 | 26 | 27 | 28 | 29 | 30 | 31 | 32 |
|---|---|---|---|---|---|---|---|---|
| Glass Transition Point (° C.) | 447.3 | 433.5 | 438.2 | 435.4 | 436.9 | 482.0 | 478.0 | |
| Coloration $\lambda_{70}$ (nm) | 452 | 451 | 444 | 442 | 445 | 445 | 445 | 440 |

TABLE 5

| (% by mass) | 33 | 34 | 35 | 36 | 37 | 38 | 39 | 40 | 41 |
|---|---|---|---|---|---|---|---|---|---|
| $Bi_2O_3$ | 71.2 | 71.5 | 70.9 | 81.4 | 80.2 | 79.0 | 52.1 | 80.6 | 81.0 |
| $SiO_2$ | 1.2 | | | | | | 4.5 | 2.6 | 15.0 |
| $B_2O_3$ | 21.1 | 21.2 | 21.1 | 18.5 | 17.7 | 16.9 | 8.3 | 3.0 | |
| $Ge_2O$ | | | | | | | | | |
| $La_2O_3$ | | | | | | | | | |
| $Gd_2O_3$ | 3.2 | 3.3 | 3.2 | | | | | | |
| $ZrO_2$ | 0.9 | 1.0 | 0.8 | | | | | | |
| $Ta_2O_5$ | 2.2 | 2.1 | 2.3 | | | | | | |
| ZnO | | | 1.6 | | | | | 3.5 | |
| CaO | | | | | | | | 2.4 | |
| BaO | | | | | | | 20.9 | 6.6 | |
| $Li_2O$ | | | | | | | 0.9 | 1.3 | |
| $Na_2O$ | | | | | | | 3.9 | | |
| $K_2O$ | | | | | | | 5.4 | | 4.0 |
| $Nb_2O_5$ | | | | | | | | | |
| $WO_3$ | | | | | 2 | 4 | 1.5 | | |
| $TiO_2$ | | | | | | | 2.5 | | |
| MgO | | 0.8 | | | | | | | |
| $Sb_2O_3$ | 0.1 | 0.005 | 0.005 | 0.1 | 0.1 | 0.1 | 0.1 | | |
| La + Gd + Ta | 5.4 | 5.4 | 5.5 | 0.0 | 0.0 | 0.0 | 0.0 | 0.0 | 0.0 |
| Bi/B | 3.4 | 3.4 | 3.4 | 4.4 | 4.5 | 4.7 | 6.3 | 26.9 | — |
| Refractive Index nd | 1.9575 | 1.9678 | 1.9740 | 2.0381 | 2.0110 | 1.9991 | 1.8290 | 2.0370 | 1.9920 |
| Abbe's Number | 21.8 | 21.9 | 22.5 | 19.9 | 19.0 | 19.2 | 24.3 | 18.3 | 18.7 |
| Glass Transition Point (° C.) | 457 | 452 | 447 | 431 | 432 | 438 | 379 | 395 | 422 |
| Coloration $\lambda_{70}$ (nm) | 422 | 452 | 427 | 439 | 440 | 442 | — | 520 | 520 |

TABLE 6

| (% by mass) | 42 | 43 | 44 | 45 | 46 | 47 | 48 | 49 |
|---|---|---|---|---|---|---|---|---|
| $Bi_2O_3$ | 79.2 | 82.2 | 82.7 | 82.4 | 83.0 | 75.6 | 79.1 | 81.3 |
| $SiO_2$ | | | | | | | | |
| $B_2O_3$ | 20.7 | 17.8 | 17.3 | 17.5 | 17.0 | 20.4 | 19.7 | 18.1 |
| $Ge_2O$ | | | | | | | | |
| $La_2O_3$ | | | | | | | | |
| $Gd_2O_3$ | | | | | | | | |
| $ZrO_2$ | | | | | | 0.8 | 0.7 | |
| $Ta_2O_5$ | | | | | | 2.1 | | |
| ZnO | | | | | | | | |
| BaO | | | | | | | | |
| $Na_2O$ | | | | | | | | |
| $K_2O$ | | | | | | | | |
| $Nb_2O_5$ | | | | | | | | |
| $WO_3$ | | | | | | | | |
| $TiO_2$ | | | | | | 1.1 | 0.4 | 0.5 |
| $Sb_2O_3$ | 0.05 | 0.02 | | 0.07 | | 0.001 | 0.02 | 0.07 |
| La + Gd + Ta | 0.0 | 0.0 | 0.0 | 0.0 | 0.0 | 2.1 | 0.0 | 0.0 |
| Bi/B | 3.8 | 4.6 | 4.8 | 4.7 | 4.9 | 3.7 | 4.0 | 4.5 |
| Bi + B | 99.9 | 100.0 | 100.0 | 99.9 | 100.0 | 96.0 | 98.9 | 99.4 |
| Bi + B + Ti | 99.9 | 100.0 | 100.0 | 99.9 | 100.0 | 97.1 | 99.3 | 99.9 |
| Ti/(Bi + Ti) | 0.000 | 0.000 | 0.000 | 0.000 | 0.000 | 0.014 | 0.005 | 0.006 |
| Refractive Index nd | 1.9968 | 2.0477 | 2.0590 | 2.0559 | 2.0650 | 2.0039 | 2.0166 | 2.0498 |
| Abbe's Number | 21.2 | 19.8 | 19.5 | 19.6 | 19.3 | 21.0 | 20.7 | 19.8 |
| Glass Transition Point (° C.) | 434 | 421 | 418 | 419 | 416 | 446 | 447 | 424 |
| Coloration $\lambda_{70}$ (nm) | 435 | 439 | 440 | 441 | 442 | 432 | 433.5 | 438 |
| Weatherability | Δ | Δ | Δ | Δ | Δ | ◎ | ○ | ○ |

TABLE 7

| (% by mass) | 50 | 51 | 52 | 53 | 54 | 55 | 56 | 57 |
|---|---|---|---|---|---|---|---|---|
| $Bi_2O_3$ | 81.2 | 79.6 | 77.9 | 81.2 | 81.9 | 79.0 | 81.2 | 86.0 |
| $SiO_2$ | | | | | | | | |
| $B_2O_3$ | 17.0 | 17.0 | 17.0 | 15.0 | 13.0 | 15.0 | 15.0 | 10.0 |
| $Ge_2O$ | | | | | | | | |
| $La_2O_3$ | | | | | | | | |
| $Gd_2O_3$ | | | | | | | | |
| $ZrO_2$ | | | | | | | | |
| $Ta_2O_5$ | | | | | | | | |
| ZnO | | | | | | 3.0 | 1.2 | 4.0 |
| BaO | | | | | | | | |
| $Li_2O$ | | | | | | | 0.5 | |
| $Na_2O$ | | | | | | | | |
| $K_2O$ | | | | | | | | |
| $Nb_2O_5$ | | | | | | | | |
| $WO_3$ | | | | 2.0 | 5.0 | 3.0 | 2.0 | |
| $TiO_2$ | 1.7 | 3.4 | 5.0 | 1.7 | | | | |
| $Sb_2O_3$ | 0.02 | 0.03 | 0.07 | 0.02 | 0.02 | 0.02 | 0.02 | 0.02 |
| La + Gd + Ta | 0.0 | 0.0 | 0.0 | 0.0 | 0.0 | 0.0 | 0.0 | 0.0 |
| Bi/B | 4.8 | 4.7 | 4.6 | 5.4 | 6.3 | 5.3 | 5.4 | 8.6 |
| Bi + B | 98.3 | 96.6 | 94.9 | 96.2 | 94.9 | 94.0 | 96.2 | 96.0 |
| Bi + B + Ti | 100.0 | 100.0 | 99.9 | 97.9 | 94.9 | 94.0 | 96.2 | 96.0 |
| Ti/(Bi + Ti) | 0.021 | 0.041 | 0.060 | 0.021 | 0.000 | 0.000 | 0.000 | 0.000 |
| Refractive Index nd | 2.0753 | 2.0899 | 2.1010 | 2.1084 | 2.1255 | 2.0874 | 2.0851 | 2.1666 |
| Abbe's Number | 18.9 | 18.3 | 17.8 | 17.8 | 17.3 | 18.8 | 18.6 | 1.7 |
| Glass Transition Point (° C.) | 427 | 430 | 432 | 430 | 433 | 429 | 430 | 422 |
| Coloration $\lambda_{70}$ (nm) | 447 | 448 | 450 | 455 | 464 | 451 | 449 | 451 |
| Weatherability | ◎ | ◎ | ◎ | ◎ | ◎ | ◎ | ◎ | ◎ |

The individual samples were prepared in the following manner.

First, each set of glass raw materials were mixed together to give a corresponding composition shown in the above tables and melted at 800 to 1050° C. for an hour using a gold crucible. After the melting, the glass melt was allowed to flow on a carbon plate and annealed and then glass samples suitable for the respective measurements were produced.

The obtained samples were evaluated for refractive index, Abbe's number, glass transition point, and coloration $\lambda_{70}$. The results are shown in Tables 1 to 7.

The refractive indices are indicated in measured values with respect to the d-line (587.6 nm) of a helium lamp.

Each Abbe's number was calculated using the refractive index at the d-line and the respective refractive indices at the F-line (486.1 nm) and C-line (586.3 nm) of a hydrogen lamp and in accordance with the formula: Abbe's number (vd)= [(nd−1)/(nF−nC)].

Each glass transition point was evaluated by a value measured by a dilatometer.

For the coloration, an optically polished glass sample with a thickness of 10 mm±0.1 mm was measured in terms of transmittance in a wavelength range of 200 to 800 nm at 0.5-nm intervals using a spectro-photometer and evaluated by the wavelength at which the sample exhibited a transmittance of 70%.

For the weatherability, an optically polished glass sample with a thickness of 10 mm±0.1 mm was allowed to stand for 168 hours at a constant temperature of 60° C. and at a constant humidity of 90% using a thermo-hydrostat, and then the surface state of the glass sample was observed in an optical microscope and evaluated in three grades of double circle "◎", empty circle "○", and empty triangle "Δ". In evaluation, double circles "◎" represent samples having exhibited substantially no alteration, empty circles "○" represent samples having exhibited some degree of alteration but being in a sufficiently usable level, and empty triangles "Δ" represent samples having exhibited irremovable alteration on the surface, such as clouding.

INDUSTRIAL APPLICABILITY

Since the optical glass for press molding according to the present invention has a high refractive index and high dispersion and is excellent in transmittance, it can enhance the performance of optical pickup lenses in various optical disc systems including CD, MD, DVD and the like and image pickup lenses in video cameras and general cameras. Furthermore, the optical glass can also be used as a glass material produced by any method other than press molding.

The invention claimed is:

1. An optical glass for press molding, having a refractive index nd of 1.925 or more, an Abbe's number vd of 10 to 30, and a glass composition, in % by mass, of 75 to 86% $Bi_2O_3$, 10 to 22.3% $B_2O_3$, 0 to 10% ZnO, 0 to 2.1% $GeO_2$, 0 to 5% $La_2O_3+Gd_2O_3+Ta_2O_5$, and 99.99% or less $Bi_2O_3+B_2O_3$, and being substantially free of lead component, arsenic component, and F component, wherein the coloration $\lambda_{70}$ is 475 nm or less.

2. The optical glass for press molding according to claim 1, containing 0 to below 3% by mass $SiO_2$.

3. The optical glass for press molding according to claim 1, wherein $Bi_2O_3B_2O_3$ is 5 or less in mass ratio.

4. The optical glass for press molding according to claim 1, containing 0.1 to 15% by mass $TiO_2$.

5. The optical glass for press molding according to claim 1, wherein a content of $Bi_2O_3+B_2O_3$ is 99% or more.

6. The optical glass for press molding according to claim 1, wherein a content of $Bi_2O_3+B_2O_3+TiO_2$ is 99% or more.

* * * * *